US008117303B2

(12) United States Patent
Fonsen

(10) Patent No.: US 8,117,303 B2
(45) Date of Patent: Feb. 14, 2012

(54) SYSTEMS, METHODS, DEVICES, AND COMPUTER PROGRAM PRODUCTS FOR DOWNLOADING CONTENT FOR OFFLINE BROWSING

(75) Inventor: Mika Fonsen, Oulu (FI)

(73) Assignee: Nokia Corporation (FI)

( * ) Notice: Subject to any disclaimer, the term of this patent is extended or adjusted under 35 U.S.C. 154(b) by 93 days.

(21) Appl. No.: 11/771,493

(22) Filed: Jun. 29, 2007

(65) Prior Publication Data
US 2009/0006308 A1    Jan. 1, 2009

(51) Int. Cl.
G06F 7/60    (2006.01)
(52) U.S. Cl. ............ 709/224; 709/219; 709/217
(58) Field of Classification Search .......... 709/224, 709/217, 203, 219, 223, 226, 229; 340/825–825.98; 370/252–253
See application file for complete search history.

(56) References Cited

U.S. PATENT DOCUMENTS

| | | | |
|---|---|---|---|
| 5,802,304 A | 9/1998 | Stone | |
| 6,088,707 A | 7/2000 | Bates et al. | |
| 6,278,449 B1 * | 8/2001 | Sugiarto et al. | 715/826 |
| 6,341,316 B1 | 1/2002 | Kloba et al. | |
| 6,351,467 B1 | 2/2002 | Dillon | |
| 6,381,592 B1 | 4/2002 | Reuning | |
| 6,421,717 B1 * | 7/2002 | Kloba et al. | 709/219 |
| 6,493,758 B1 | 12/2002 | McLain | |
| 6,505,242 B2 | 1/2003 | Holland et al. | |
| 6,553,412 B1 | 4/2003 | Kloba et al. | |
| 6,591,288 B1 | 7/2003 | Edwards et al. | |
| 6,611,862 B2 | 8/2003 | Reisman | |
| 6,615,276 B1 | 9/2003 | Mastrianni et al. | |
| 6,658,464 B2 | 12/2003 | Reisman | |
| 6,779,042 B1 | 8/2004 | Kloba et al. | |
| 6,820,116 B1 | 11/2004 | Pyhalammi et al. | |
| 6,839,744 B1 | 1/2005 | Kloba et al. | |
| 6,883,020 B1 * | 4/2005 | Taranto et al. | 709/213 |
| 7,188,240 B1 | 3/2007 | Berstis et al. | |

(Continued)

FOREIGN PATENT DOCUMENTS

EP    1 276 336    1/2003

(Continued)

OTHER PUBLICATIONS

PC Alarm Clock Software & Reminder available at: http://www.wakeupnews.com.
Joshi et al., "On Disconnected Browsing of Distributed Information," *Research Issues in Data Engineering—IEEE Comput. Soc.*, Apr. 1997.

(Continued)

*Primary Examiner* — Wing Chan
*Assistant Examiner* — Ruolei Zong
(74) *Attorney, Agent, or Firm* — Alston & Bird LLP

(57) ABSTRACT

Systems, methods, devices and computer program products are provided for: receiving an indication that an electronic device is to be communicatively disconnected from a network; downloading information from the network in response to the received indication, but before the electronic device is disconnected from the network; and storing the downloaded information in the electronic device so that the information is available for offline browsing. For example, a user may instruct an electronic device to disconnect from a network. The user may also specify an amount of time before the device must disconnect from the network. The device may then begin pre-caching network content until the specified amount of time expires. When the specified amount of time expires, the device may disconnect from the network, but the user can continue to browse network content offline by browsing the pre-cached network content stored in a local memory.

37 Claims, 7 Drawing Sheets

U.S. PATENT DOCUMENTS

| | | | |
|---|---|---|---|
| 2001/0003828 A1 | 6/2001 | Peterson et al. | |
| 2001/0007105 A1 | 7/2001 | Brotz et al. | |
| 2002/0010758 A1 | 1/2002 | Chan | |
| 2003/0006912 A1 | 1/2003 | Brescia | |
| 2004/0012625 A1 | 1/2004 | Lei et al. | |
| 2004/0248588 A1 | 12/2004 | Pell et al. | |
| 2005/0188051 A1 | 8/2005 | Sneh | |
| 2006/0004923 A1* | 1/2006 | Cohen et al. | 709/228 |
| 2006/0047775 A1* | 3/2006 | Bruck et al. | 709/217 |
| 2007/0011130 A1 | 1/2007 | Yamabuchi | |
| 2007/0038931 A1 | 2/2007 | Allaire et al. | |

FOREIGN PATENT DOCUMENTS

| | | |
|---|---|---|
| EP | 1 486 889 | 12/2004 |
| EP | 1 631 035 | 3/2006 |
| WO | WO 2004/042606 | 5/2004 |

OTHER PUBLICATIONS

Search Report and Written Opinion for PCT/IB2008/052305 dated Dec. 4, 2008.

Zhimei Jiang, Leonard Kleinrock, *Web Prefetching in a Mobile Environment, IEEE Personal Communications*, pp. 25-34, Oct. 1998.

Search Report and Written Opinion for PCT/FI2009/050218 dated Jul. 8, 2009.

WebStripper Offline Browser. Download Web Sites and Browse Offline [online] [retrieved Mar. 8, 2007]. Retrieved from the Internet: <URL:http://webstripper.net/features.html>. 4 pages.

Non-Final Rejection for Korean Patent Application No. 10-2010-7002183, dated May 30, 2011.

Notification of Reason for Rejection from Japanese Patent Application No. 2010-512816, dated Nov. 8, 2011.

* cited by examiner

SYSTEMS, METHODS, DEVICES, AND COMPUTER PROGRAM PRODUCTS FOR DOWNLOADING CONTENT FOR OFFLINE BROWSING

FIELD OF EMBODIMENTS OF THE INVENTION

Embodiments of the invention relate generally to systems, devices, methods, and computer program products configured to download and store content from a network for use by a device when the device is not connected to the network. More particularly, embodiments of the present invention provide for the downloading of content to be used for offline browsing, the downloading in response to an indication that the device is going to change from an online mode to an offline mode.

BACKGROUND OF EMBODIMENTS OF THE INVENTION

Many mobile devices are now configured to wirelessly access the Internet or other communication networks so that a user can browse content on the network using the mobile device. Often, however, a user of a mobile device will encounter several common situations that limit the user's ability to access the network using the mobile device. For example, a user may be entering into an area, such as an airplane, hospital, classroom, church, or the like, with known restrictions on mobile device usage and/or wireless network connectivity. In such a situation, the user must either turn off the phone, or at least disconnect from the network by other means, such as by changing the device from an "online" mode to an "offline" mode. In another example, a user's connection to the network may be limited or lost when the user is traveling from one location to another since the user may enter an area where the mobile device cannot wirelessly communicate with the network. In yet another example, the user may be accessing the network in a known hotspot that offers high-speed network connectivity. At some point, however, the user may have to leave the hotspot and, therefore, may have to disconnect from the network. While the transition to the offline mode may occur in response to a complete disconnection of the mobile device from all networks, the mobile device may also transition to an offline mode (relative to the network via which the mobile device had previously been communicating) in instances in which the mobile device switches networks. As such, "offline" relates to whether the mobile device is offline from the network that had previously been servicing the mobile device, regardless of whether the mobile device is now completely disconnected from all networks or is currently being service by another network.

Often times when a user is forced to disconnect from a network, such as the Internet, for the reasons listed above or for any other reason, the user is not finished browsing the network content that the user desires to browse. Furthermore, even if the user can quickly reconnect to the network, the user may not be able to easily return to the place in the network where the user had been browsing when the mobile device was disconnected from the network. In situations where the network content is frequently modified, when the user reconnects to the network at a later time, the user may not be able to find the link or content that the user was about to browse before the user was disconnected from the network, since the content or link may have been deleted or changed in the interim.

Another problem with accessing the Internet or other networks using a mobile device is that many network service providers charge a user based on the amount of time that a user is connected to the network. This type of payment structure may not be an efficient way for the user to browse information on the Internet, since the user may download a web page and spend a considerable amount of time looking at this web page before downloading another web page. In such a scenario, the user may be charged for all of the time that he or she is looking at the one web page, even though the user may not be using the network connection from the moment in time when the first web page is downloaded to the moment in time when the second web page is downloaded.

Currently, some web browsers are configured to perform an operation known as "pre-caching," where the web browser instructs a device to download and store web pages before a user attempts to view or otherwise access the web page. In this way, if the user clicks on a link to a web page that has been pre-cached by the device, the device can display the web page to the user quicker than if the user had to wait for the device to download the web page. Such web browsers may also permit offline browsing, so that if a device temporarily loses service, the user can still perform limited browsing of any cached or pre-cached web pages. A problem with current caching and pre-caching systems is that they perform the caching or pre-caching functions continuously, whenever the user is connected to the network. This can present a significant problem for mobile devices since caching and pre-caching operations require significant processing power and battery power, both of which may be precious to the mobile device. Furthermore, these continuous caching and pre-caching systems do little to address the expense problem and, in fact, may cost a mobile user more if the user's network service provider charges a fee based on the number of content requests (e.g., HTTP requests) made to the network by the mobile device.

BRIEF SUMMARY OF EMBODIMENTS OF THE INVENTION

In light of the foregoing background, exemplary embodiments of the present invention provide systems, methods, devices, and computer program products configured for: receiving an indication that an electronic device is to be communicatively disconnected from a network; downloading information from the network in response to the received indication, but before the device is disconnected from the network; and storing the downloaded information in the electronic device so that the information is available for offline browsing. For example, a user may instruct an electronic device to disconnect from a network. The user may also specify an amount of time before the device must disconnect from the network. In response to the instruction to disconnect from the network, the device may automatically begin pre-caching network content until the specified amount of time expires. When the specified amount of time expires, the device may disconnect from the network, but the user can continue to browse network content offline by browsing the pre-cached network content stored in a local memory.

More generally, embodiments of the present invention may provide an apparatus having means for communicatively connecting the apparatus to a network and means for communicating with at least one other device on the network. The apparatus also has means for receiving an indication that the apparatus will be communicatively disconnected from the network. The apparatus further includes means for downloading information from at least one device on the network in response to a received indication that the apparatus will be communicatively disconnected from the network. The apparatus further includes means for storing the downloaded information in the apparatus so that the apparatus may access the downloaded information when the apparatus is communicatively disconnected from the network.

For example, embodiments of the present invention may provide an apparatus having a communication interface configured to communicatively connect to a network; a memory device configured for storing data; and a processor operatively coupled to the communication interface and the memory device and configured to use the communication interface to communicate with at least one other device on the network when the communication interface is communicatively connected to the network. When the communication interface is communicatively connected to the network, the processor is configured to receive an indication that the communication interface will be communicatively disconnected from the network. In response to receiving the indication that the communication interface will be communicatively disconnected from the network, the processor is configured to use the communication interface to download information from at least one device on the network. The processor stores the downloaded information in the memory device so that the processor may access the downloaded information when the apparatus is communicatively disconnected from the network.

In one embodiment, the apparatus further includes has a user interface operatively coupled to the processor and configured to permit communication between a user of the apparatus and the processor. In such an embodiment, in response to receiving the indication that the communication interface will be communicatively disconnected from the network, the processor is configured to use the user interface to ask the user whether the processor should download and store information from at least one device on the network to allow for offline browsing of the downloaded information. In another embodiment of the apparatus, however, the processor is configured to automatically (i.e., without requiring actuation of a user input device to perform the stated operation) begin downloading and storing information from at least one device on the network in response to receiving the indication that the communication interface will be communicatively disconnected from the network.

In one embodiment of the apparatus, in response to receiving the indication that the communication interface will be communicatively disconnected from the network, the processor is configured to use the communication interface to perform pre-caching of network content by downloading the information from the at least one device and storing the downloaded information in the memory device without displaying the downloaded information on a display of the apparatus. In one embodiment, the processor may be configured to only perform the pre-caching of network content after receiving the indication that the communication interface will be communicatively disconnected from the network.

In embodiments where the apparatus includes a user interface operatively coupled to the processor and configured to permit communication between a user of the apparatus and the processor, the indication that the communication interface will be communicatively disconnected from the network may include user input received from the user interface, the user input instructing the processor to communicatively disconnect from the network.

In embodiments where the apparatus's communication interface is configured to wirelessly connect to the network, the processor receiving an indication that the communication interface will be communicatively disconnected from the network may include the processor determining that the communication interface will be communicatively disconnected from the network. The processor may determine that the communication interface will be communicatively disconnected from the network based on information about the position of the apparatus and/or wireless characteristics of the communication interface, the network, and/or a network communication signal received by the communication interface.

In one embodiment of the apparatus, the indication that the communication interface will be communicatively disconnected from the network further provides an indication of an amount of time before the communication interface is to be communicatively disconnected from the network. For example, the amount of time may be defined by user input. In one embodiment, the processor may be configured to download and store as much information from the network as it can within the indicated amount of time, the processor downloading and storing the information in accordance with predetermined instructions stored in the memory device.

In one embodiment of the apparatus, in response to receiving the indication that the communication interface will be communicatively disconnected from the network, the processor is configured to download and store user-selected information from the network. For example, the user-selected network information may include network information associated with network destinations identified in a list of the user's favorite or most commonly viewed network destinations stored in the memory. Alternatively, the information to be downloaded may be based upon the behavior of other users which, may, for example, be predictive of the content.

In one embodiment of the apparatus, in response to receiving the indication that the communication interface will be communicatively disconnected from the network, the processor is configured to download and store information from the network based on predefined rules stored in the memory device. For example, predefined rules stored in the memory device may instruct the processor to download and store network information associated with at least one link identified in at least one recently viewed network page.

In an embodiment where the apparatus has a user interface operatively coupled to the processor and configured to permit communication between a user of the apparatus and the processor, the indication that the communication interface will be communicatively disconnected from the network may include user input received from the user interface, the user input instructing the processor to communicatively disconnect from the network at a particular point in time. In response to the received indication, the processor is configured to download and store network content before the particular point in time. The processor may then disconnect from the network at the particular point in time.

In another embodiment of the apparatus, in response to receiving the indication that the communication interface will be communicatively disconnected from the network, the processor is configured to download and store predefined information from the network. The processor may then be configured to automatically disconnect from the network after the processor downloads the predefined information from the network.

Embodiments of the present invention further provide a method comprising: (i) communicatively connecting a first device to a network, the network having at least one other device communicatively connected thereto; (ii) receiving an indication that the first device is to be communicatively disconnected from the network; (iii) downloading information from at least one other device communicatively connected to the network in response to the received indication that the first device is to be communicatively disconnected from the network; and (iv) storing the downloaded information in a memory of the first device. In one embodiment, receiving the indication that the first device is to be communicatively disconnected from the network includes receiving user input instructing the first device to communicatively disconnect from the network.

In an exemplary embodiment of the method, receiving an indication that the first device is to be communicatively disconnected from the network may further include receiving an indication of an amount of time before the first device is to be communicatively disconnected from the network. In such an embodiment, receiving an indication of an amount of time before the first device is to be communicatively disconnected from the network may include receiving user input specifying the amount of time before the first device is to be communicatively disconnected from the network. Furthermore, downloading information from at least one other device communicatively connected to the network may include downloading as much information from the network as possible within the indicated amount of time, in accordance with predetermined downloading instructions.

In some embodiments, downloading information from at least one other device communicatively connected to the network includes downloading user-selected information from the network. For example, user-selected network information may include network information associated with network destinations identified in a user's favorites list stored in the memory of the first device.

In some embodiments, downloading information from at least one other device communicatively connected to the network includes downloading information from the network based on predefined rules stored in the memory. For example, such predefined rules may instruct the processor to download and store network information associated with at least one link identified in at least one recently viewed network page. Other examples of the predefined rules are based, for example, on the type of content, the source of content, favorite types of content as identified by the user, etc.

In one embodiment, downloading information from at least one other device communicatively connected to the network includes downloading predefined information from the network. In such an embodiment, the method may further involve disconnecting the first device from the network in response to an indication that the predefined information from the network has been downloaded and stored.

Embodiments of the present invention further provide a computer program product comprising at least one computer-readable storage medium having computer-readable program code logic stored therein. The computer-readable program code logic may include, for example: first code logic configured for receiving an indication that a first device is to be communicatively disconnected from a communication network; and second code logic configured for downloading information from at least one other device communicatively connected to the network in response to the received indication that the first device is to be communicatively disconnected from the network.

In an exemplary embodiment of the computer program product, the first code logic is further configured to receive an indication of an amount of time before the first device is to be communicatively disconnected from the network. In such an embodiment, the first code logic may further include code logic configured for receiving user input specifying the amount of time before the first device is to be communicatively disconnected from the network. Furthermore, the second code logic may include code logic configured for downloading as much information from the network as possible within the indicated amount of time, in accordance with predetermined downloading instructions.

In an exemplary embodiment, the computer program product includes code logic configured for allowing a user to specify the network information to be downloaded by the second code logic in response to the received indication that the first device is to be communicatively disconnected from the network. In another embodiment, the computer program product includes code logic configured for defining the network information to be downloaded by the second code logic in response to the received indication that the first device is to be communicatively disconnected from the network. In such an embodiment, the code logic may be further configured to define the network information to be downloaded based on network information recently accessed by the user and/or other network information not accessed by the user but identified in the network information recently accessed by the user.

In one embodiment of the computer program product, the second code logic is further configured to download predefined information from the network. In such an embodiment, the computer-readable program code logic may further include code logic configured for disconnecting the first device from the network in response to an indication that the predefined information from the network has been downloaded and stored.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF EMBODIMENTS OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
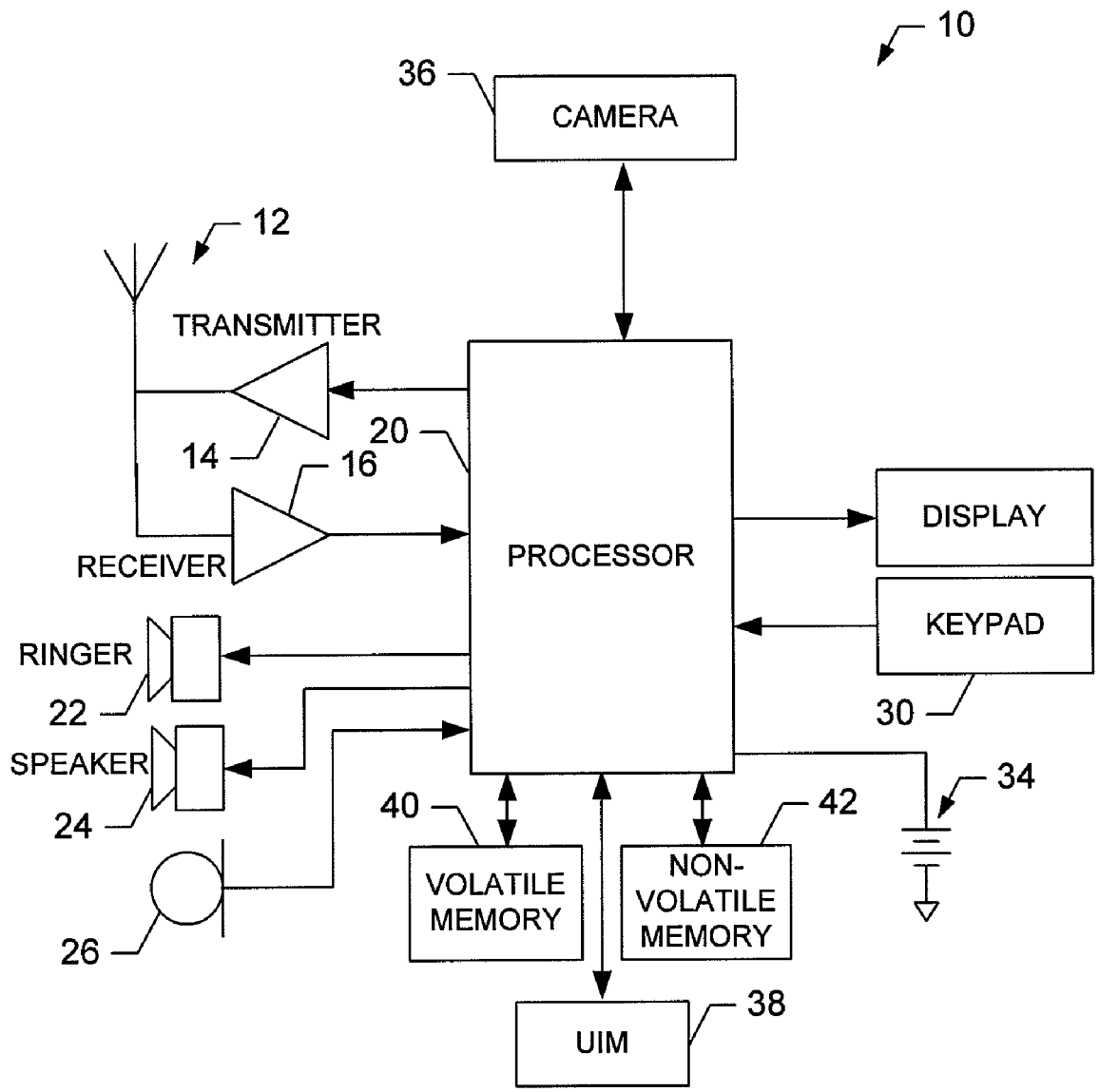
FIG. 1 is a schematic block diagram of a mobile terminal in accordance with an exemplary embodiment of the present invention.

FIG. 1 illustrates a block diagram of an electronic device, and specifically a mobile terminal 10, that may benefit from embodiments of the present invention. While several embodiments of the mobile terminal 10 are illustrated and will be hereinafter described for purposes of example, other types of electronic devices, such as digital cameras, portable digital assistants (PDAs), pagers, mobile televisions, computers, laptop computers, and other types of systems that manipulate and/or store data files, can readily employ embodiments of the present invention. Such devices may or may not be mobile.

The mobile terminal 10 includes a communication interface comprising an antenna 12 in operable communication with a transmitter 14 and a receiver 16. The mobile terminal 10 further includes a processor 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the processor 20 includes circuitry required for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 can additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a camera 36 in communication with the processor 20. The camera 36 may be any means for capturing an image for storage, display or transmission. For example, the camera 36 may include a digital camera capable of forming a digital image file from a captured image. As such, the camera 36 includes all hardware, such as a lens or other optical device, and software necessary for creating a digital image file from a captured image. Alternatively, the camera 36 may include only the hardware needed to view an image, while a memory device of the mobile terminal 10 stores instructions for execution by the processor 20 in the form of software necessary to create a digital image file from a captured image. In an exemplary embodiment, the camera 36 may further include a processing element such as a co-processor which assists the processor 20 in processing image data and an encoder and/or decoder for compressing and/or decompressing image data. The encoder and/or decoder may encode and/or decode according to a JPEG standard format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
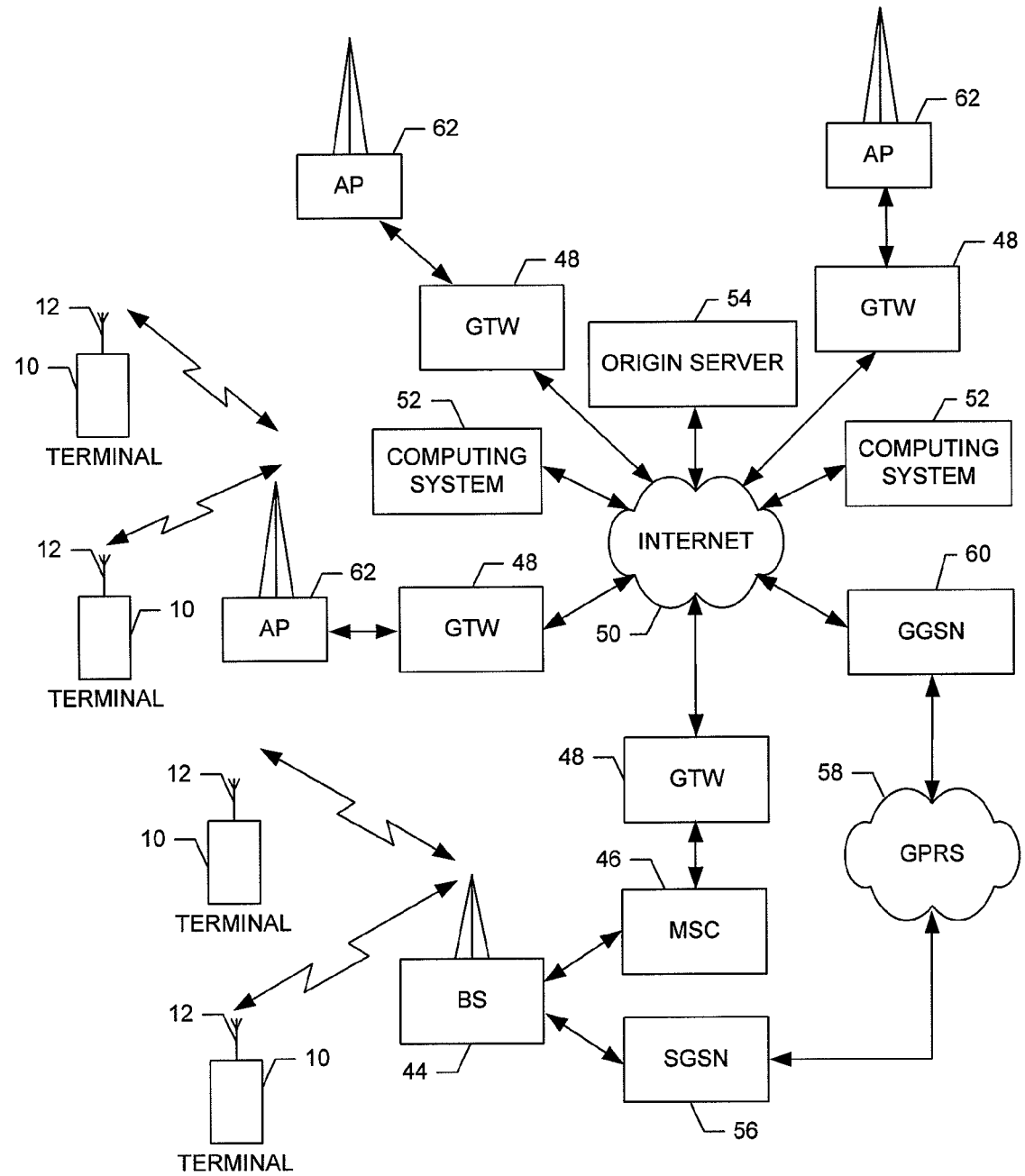
FIG. 2 is a schematic block diagram of one type of system in which embodiments of the present invention may be configured to operate, according to an exemplary embodiment of the present invention.

Referring now to FIG. 2, an illustration is provided of one type of system in which embodiments of the present invention may be configured to operate. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
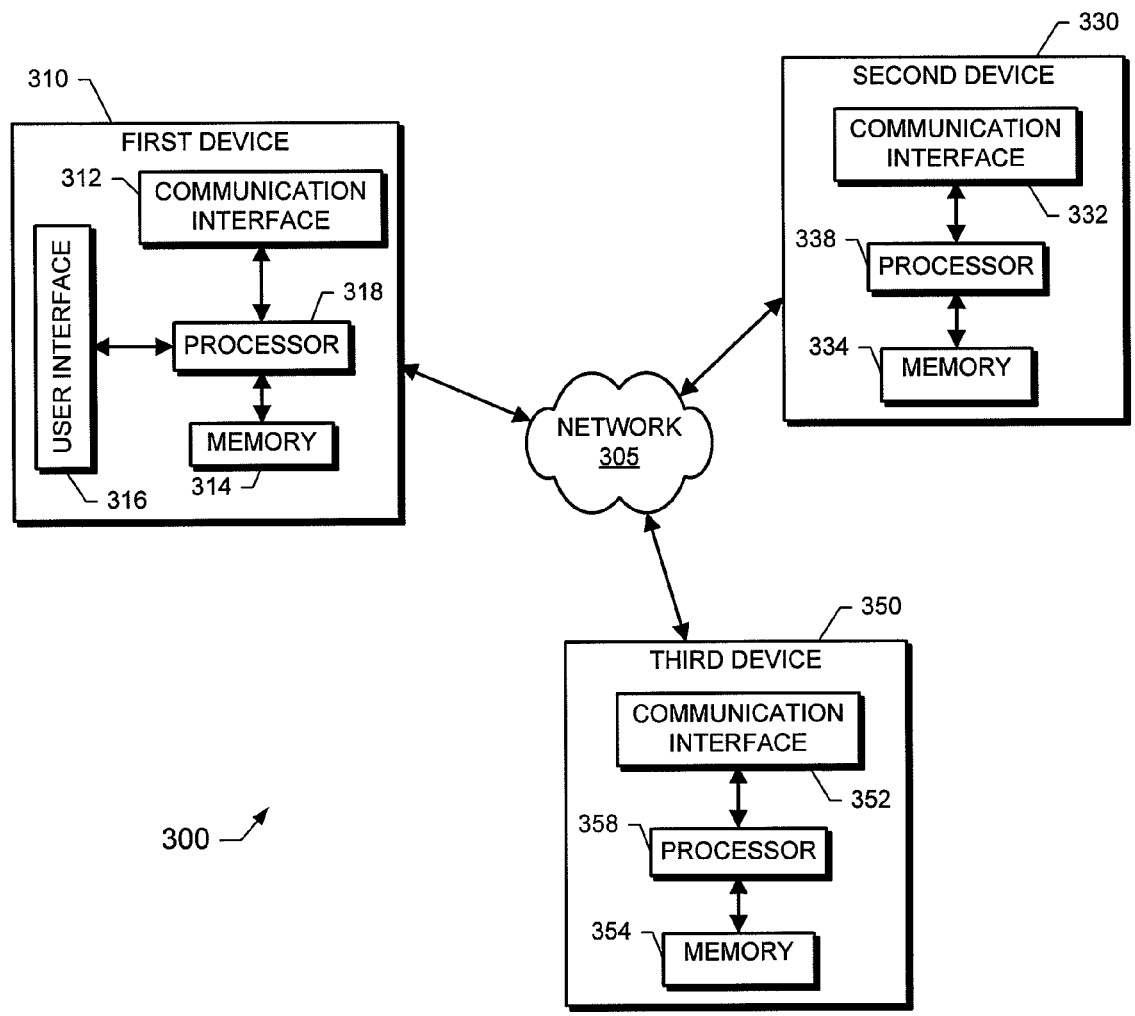
FIG. 3 is a schematic block diagram of a system that allows for online browsing of network content and pre-caching of network content to provide for offline browsing of such pre-cached content, in accordance with an exemplary embodiment of the present invention.

Referring now to FIG. 3, a schematic block diagram is provided of a system 300 that allows for online browsing of network content and pre-caching of network content to provide for offline browsing of such pre-cached content in accordance with one embodiment of the present invention. As illustrated in FIG. 3, in an exemplary embodiment, the system 300 includes at least a first device 310 and a second device 330 communicatively coupled to each other via a network 305 or other communication system. In the illustrated embodiment, the system 300 also includes a third device 350 communicatively coupled to the first device 310 and, in some cases, to the second device 330 via the network 305. In other embodiments, the system 300 may have more or less devices communicatively coupled to the first device via the network 305.

In an exemplary embodiment, the first device 310 is a mobile terminal, such as the mobile terminal 10 described above with respect to FIG. 1. In another embodiment, the first device 310 may be a personal computer or other electronic device. The second device 330 and the third device 350 are also both electronic devices and, in one embodiment, the second and third devices are embodied as computing devices 52 or origin servers 54 described above with respect to FIG. 2. For example, the second device 330 or the third device 350 may be embodied as a server communicatively coupled to a network 305, such as a web server coupled to the Internet. In other embodiments, however, the second device 330 or the third device 350 may be embodied as a mobile terminal, such as the mobile terminal 10 described above, or any other electronic device.

In an exemplary embodiment, the network 305 includes some or all of the communication system described above with respect to FIG. 2. In this regard, the network 305 may include a LAN, a WAN, or a combination of one or more LANs and WANs. In an exemplary embodiment, the network 305 includes the Internet and the devices are configured to communicate with each other using, for example, HTTP, WAP, TCP/IP, FTP, or any other communication protocol or combination of protocols used to communicate with devices on the Internet. The first, second, and third device may be communicatively connected to the network 305 using wireless or wireline connections means.

As illustrated in FIG. 3, the first device 310 generally includes processing means, such as a processor 318. Operatively coupled to the processor 318 is a means for storing data, such as a memory 314 configured for storing cached or pre-cached network content therein. The memory 314 may also include computer-readable program instructions stored therein that can be executed by the processor 318 to perform certain predefined processes or process steps in the first device 310, such as the processes described below with reference to FIGS. 4-7. As described above with respect to the mobile terminal 10 of FIG. 1, the memory 314 may also be configured to store network connectivity software. For example, the memory 314 may contain web browsing software that can be executed by the processor 318 to browse content on the second device 330 by communicating, for example, HTTP requests, WAP requests, or the like to the second device 330 and by receiving and utilizing HTTP responses, WAP responses, or the like encoded using, for example, HTML (Hypertext Markup Language), XML (Extensible Markup Language), WML (Wireless Markup Language), HDML (Handheld Device Markup Language), or the like. As also described above, the memory 314 may be fixed or removable and local or external with respect to the first device 310.

The first device 310 may further include means for communicating with a user of the first device, such as a user interface 316 operatively coupled to the processor 318. The user interface 316 may be configured to receive input from a user and communicate the input to the processor 318. For example, the user interface 316 may include a touch screen, touchpad, microphone, mouse, joystick, keypad, and the like. The user interface 316 may also be configured to communicate output to a user based on signals received from the processor 318. For example, the first device 310 will typically include a display device and a loudspeaker.

The first device 310 may further include means for communicatively connecting to a network and communicating with network devices. For example, the first device 310 may include a communication interface 312 operatively coupled to the processor 318 and configured to send and receive communications to and from other devices, such as the second device 330, the third device 350, or some other network device. For example, the communication interface 312 may include a wireless transceiver configured to communicate using radio frequency signals, infrared signals, or signals composed of waves from any other portion of the electromagnetic spectrum.

As also illustrated in FIG. 3, the second device 330 typically includes processing means, such as a processor 338. The processor 338 is operatively coupled to communication means, such as a communication interface 332, for communicating with the first device 310. The processor 338 is also operatively coupled to storage means, such as a memory 334. The communication interface 332 is configured to send and receive communications from other devices, such as the first device 310 or other network device. The memory 334 is configured to store information therein that can be accessed by the processor 338. The memory 334 may include computer-readable program instructions stored therein that are configured to be executed by the processor 338 to perform certain predefined processes or process steps in the second device 330. For example, the memory 334 may include software stored therein that, when executed by the processor 338, allows the second device 330 to receive HTTP requests or similar requests from the first device 310 and respond to such requests with HTTP responses or similar responses in the form HTML documents, XML documents, WML documents, HDML documents, or the like, and/or with other content from the memory 334. In this regard, the memory 334 generally includes content stored therein that the second device 330 is willing to share with other devices, such as the first device 310, on the network 305.

Figure 4:
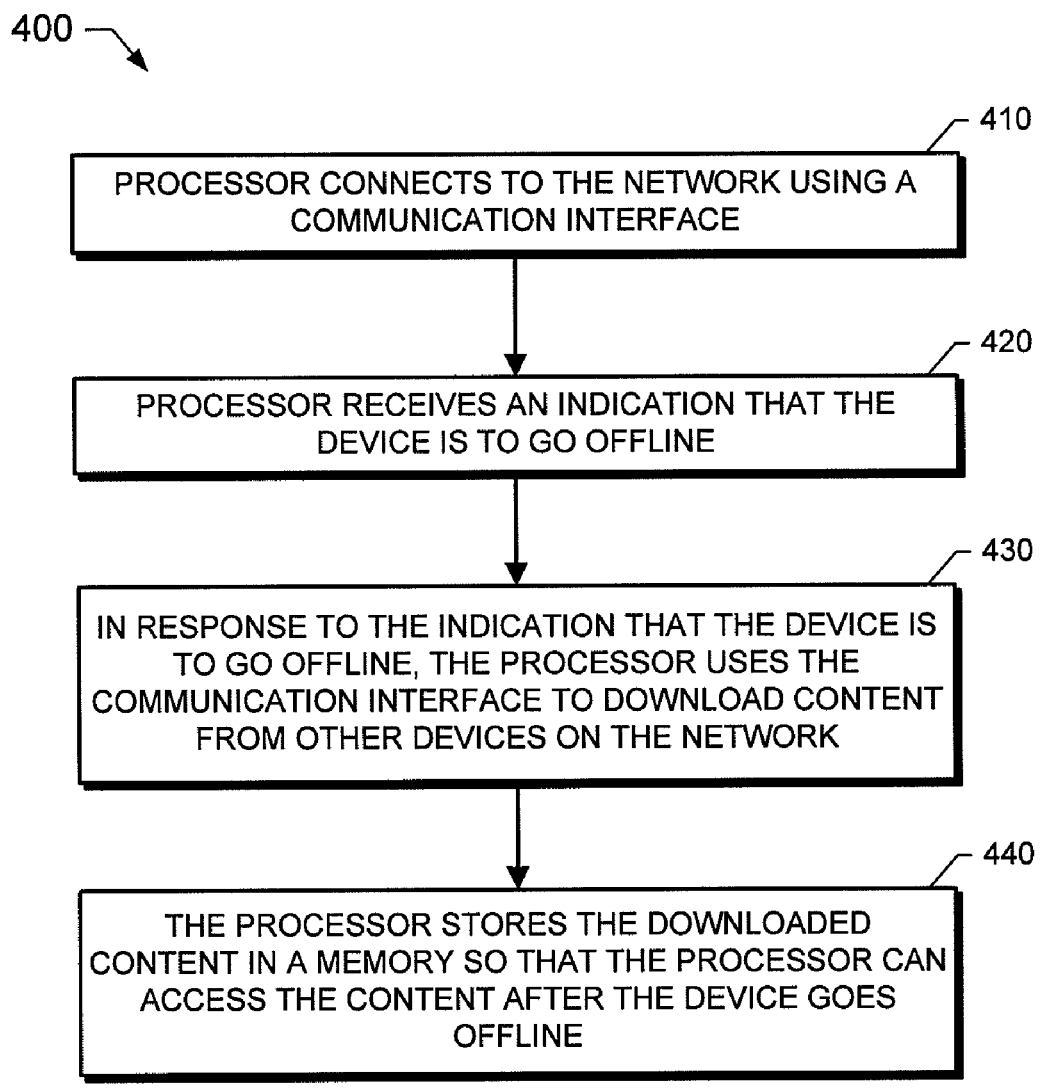
FIG. 4 is a flow diagram illustrating, in general terms, the process executed by the first device of FIG. 3, in accordance with an embodiment of the present invention.

FIG. 4 is a flow diagram illustrating a process 400 that may be executed by the first device 310 of FIG. 3 in accordance with an exemplary embodiment of the present invention. As illustrated by block 410, the processor 318 of the first device 310 communicatively connects to the network 305 using the communication interface 312. For example, the processor 318 may receive instructions to enter an "online mode" from a user when the user actuates a particular user input device of the user interface 316. In the online mode, the processor 318 may then be configured to communicate with other terminals 10, computing systems 52, and servers 54 on the Internet 50 using, for example, a Gateway 48 or a GPRS 58, as illustrated in FIG. 2. In another embodiment, the processor 318 may be configured to use a communication interface 312 (e.g., a radio frequency transceiver, an infrared signal transceiver, or the like) of the first device 310 to communicate directly with another terminal or computing device using, for example, a direct Bluetooth or infrared connection with the other device.

When the first device 310 is in an "online mode" the processor 318 may be further configured to execute network browsing software, such as a web browser, stored in the memory 314. The network browsing software may then be used to display information (e.g., "network content") received from other devices on the network and to allow for communication between the first device 310 and other devices, such as the second device 330, on the network 305. For example, network content received by the first device 310 from other devices on the network may include, for example, web pages or documents of any format, including but not limited to RSS feeds ("RSS" referring to the Really Simple Syndication standard RSS 2.0, the Rich Site Summary standard RSS 0.91/1.0, or the RDF Site Summary standard RSS 0.9/1.0), podcast feeds, XML documents, HTML documents, WML documents, blogs, widgets, the WidSets® service offered by Nokia Corporation (see, e.g., www.widsets.com), mp3 files, general media files and the like.

As illustrated by block 420, when the first device 310 is connected to the network 305 (e.g., when the first device is in an "online" mode of operation), the processor 318 may receive an indication that the first device 310 is to be disconnected from the network 305. For example, as described in more detail below, the processor 318 may receive an indication from the user interface 316 that the user desires for the processor 318 to disconnect the device 310 from the network 305 (e.g., the user may instruct the processor 318 to change from an "online" mode of operation to an "offline" mode of operation). In another example, the processor 318 may receive such an indication by receiving information about the first device's position relative to the wireless network and/or about the strength of a wireless signal between the communication interface 312 and a network device. In such an example, the processor 318 may then use such information to determine that the first device 310 will likely be disconnected from the network 305 (e.g., by determining that the first device 310 is about to leave the wireless network or that the wireless signal is decreasing and is so low that the network connection is likely be terminated).

The indication that the first device 310 is to be disconnected from the network 305 may be provided in various manners. In addition to receiving an indication from the user directly, the processor 318 may be configured to consult a calendar, typically stored in memory associated with the processor 318, which provides information regarding when the network 305 generally provides good coverage and when the network is scheduled to be down or otherwise unavailable (for maintenance or the like) or when the network 305 is predicted to be down or otherwise unavailable based on past network performance. In this embodiment, the processor 318 may anticipate an upcoming network outage and pre-cache at least some content prior to transitioning to the offline mode.

In another embodiment, the user may indicate a desire to disconnect from the network 305. Following downloading of the content as described below, the first device 310 need not go immediately offline, but may, instead, present the user with a question upon the user interface as to whether the user still desires to go offline. The user can then either confirm the prior intention to go offline, or may indicate that they now desire to remain online. Even in instances in which the first device 310 remains online, the downloading is useful since the content can now generally be accessed more expeditiously once the content is stored by the first device 310 as opposed to accessing the content via the network 305.

As generally described by way of example herein, the transition to the offline mode may occur in response to a complete disconnection of the first device 310 from all networks. However, the first device 310 may also transition to an offline mode (relative to the network 305 via which the first device 310 had previously been communicating) in instances in which the first device 310 switches networks. As such, "offline" relates to whether the first device 310 is offline from and, therefore no longer connected to, the network 305 that had previously been servicing the first device 310, regardless of whether the first device 310 is now completely disconnected from all networks or is currently being service by another network. For example, a mobile device may initially be operating within its home domain, that is, the wireless local area network established between the equipment disposed with the user's home. While within the home domain, the mobile device may receive an indication that the mobile device will be leaving the home domain (thereby going offline from the perspective of the home domain) and entering a GPRS network. Since service via the GPRS network may be more costly for the user than service within the home domain, it may still be advantageous from a cost standpoint to download content prior to leaving the home domain even though the mobile device will retain network connectivity via the GPRS network.

As illustrated by block 430, in response to such an indication that the first device 310 is to be disconnected from the network 305, the processor 318 uses the communication interface 312 to download content from other devices on the network 305. As illustrated by block 440, the processor 318 may then store the downloaded content in the memory 314 so that the processor 318 can access the content after the device 310 disconnects from the network 305. In other words, in response to an indication that the first device 310 is to be disconnected from the network 305, the processor 318 begins pre-caching network content so that the user can browse the content after the first device 310 disconnects from the network 305. During the time that the processor 318 is downloading and storing network content, the user may be viewing and/or downloading other network content or the user may be performing other functions with the first device 310 or may not be interacting with the first device 310 at all.

The processor 318 may pre-cache network content, or otherwise download and store network content, by submitting requests for network content to the second device 330, the third device 350, and/or other network devices via the communication interface 312 and the network 305. For example, where the network 305 comprises the World Wide Web, the processor 318 may use the communication interface 312 along with web browsing software stored in the memory 314 to submit one or more HTTP requests to the second device 330. In response to the HTTP requests, the second device 330 may communicate content (e.g., a web page, podcast, or RSS feed) from its memory 334 to the first device 310. Instead of immediately presenting the content to the user by, for example, displaying the content on a display of the user interface 316, the processor 318 of the first device 310 may store the content received from the second device 330 in the memory 314. In this way, after the first device 310 is disconnected from the network 305, the first device 310 may still provide the user with limited network content browsing ability. For example, if the user of the first device 310 requests (e.g., by clicking on a link in a web page) the same network content that was stored in the memory 314, the processor 318 can present the network content to the user by retrieving the content from the memory 314 instead of from the network 305. In other words, in one embodiment, the processor 318 is configured (e.g., by executing computer program instructions) such that a user can browse cached or pre-cached network content stored in the memory 314 using a network browser in the same way as the user would browse information on the network 305. If the user attempts to browse information that was not downloaded and stored before the first device 310 disconnected from the network 305, then the processor 318 may display an error/offline message to the user.

In block 430, the processor 318 of the first device 310 must determine which network content should be downloaded and stored in the local memory 314 before the first device 310 is disconnected from the network 305. In this regard, the processor 318 may be configured to determine which content to download and store based on predefined rules, recent browsing activity, user selections, and the like, or any combination of these factors or similar factors. For example, the first device 310 may have a plurality of predefined pre-caching rules stored in the memory 314. These predefined rules may instruct the processor 318 as to which network content the processor 318 should download in response to an indication that the first device 310 is to become communicatively disconnected from the network 305. The predefined rules may also specify the order in which the processor 318 should download the content.

For example, in an exemplary embodiment, the memory 314 contains pre-caching rules that instruct the processor 318 to download content based on recent browsing activity. For instance, the rules may instruct the processor 318 to download and store a "first level" of web pages (or other network content) accessed from at least some of the links on the last web page or the last x-number of web pages viewed by the user, where "x" may be a user-selected number or a default number. The pre-caching rules may further instruct the processor 318 to download and store a "second level" of web pages (or other content) accessed from some of the links found in the "first level" web pages. In this regard, the memory 314 of the first device 310 may include web-crawling software that instructs the processor 318 to identify links on a downloaded web page and to follow at least some of the identified links to other web pages, where additional links may be identified and followed, and so on. The web-crawling software may specify a default number of web page levels to follow during the pre-caching operation or the number of levels may be specified by the user. The web-crawling software may further instruct the processor 318 as to which types of links are likely to be relevant or irrelevant to the web page recently viewed by the user. In this way, web-crawling software may instruct which links should be pre-cached and/or followed during the pre-caching operation. For example, the web-crawling software may be configured to recognize certain types of advertising links on a web page and may be configured to ignore these links and any network content associated with these links during the pre-caching operation.

In other embodiments, the pre-caching rules are based on other information. For example, the user may generate a list of the user's favorite web pages and the pre-caching rules may instruct the processor 318 to download and store the listed web pages as well as web pages accessed by links on the listed web pages (and links from those pages and so on until some default or user-selected link depth or until the first device 310 is disconnected from the network 305). In this example, the user may administer the downloading process via input provided via a web page. As such, the user can identify the content to be downloaded and the order in or prioritization with which the content is to be downloaded. In another exemplary embodiment, the processor 318 generates a list of the user's most frequently viewed web pages and the pre-caching rules instruct the processor 318 to download and store the listed web pages as well as web pages accessed by links on the listed web pages.

Where necessary, the pre-caching rules may have default values and these default values may be generally reconfigurable by the user of the first device 310. For example, in one embodiment during a pre-caching operation, the pre-caching rules may allow only three seconds for the processor 318 to download a particular item of network content (e.g., a web page). If the three seconds expire and the processor 318 still has not downloaded the item of network content, then the processor 318 may be instructed to move on to any other items of network content to be downloaded. The three seconds, however, may be merely a default value and the system that is configured such that a user can alter the three-second default value if, for example, the user knows that a favorite website often takes more than three seconds to download. In some embodiments, the pre-caching rules may be modified automatically based on, for example, the battery power or the processing power available to the first device 310. For example, where the processor 318 determines that battery power is very low, the processor 318 may be instructed to conduct more limited pre-caching (or even no pre-caching) compared to the pre-caching that the processor 318 would perform if the first device 310 had full battery power.

The method and apparatus of other embodiments may determine the content to be downloaded and the relative prioritization of that content in accordance with a variety of different rules. For example, the pre-caching rules may dictate that the order in which content is to be downloaded is based upon the type of content to be downloaded. In this regard, textual documents may be initially downloaded, followed by smaller photographs (i.e., photographs that are less than a predefined size), then larger photographs and so on. Other pre-caching rules include, for example, a prioritization based on the source of the content, such as websites, blogs, rss/atom feeds, etc., or based on favorite types of content that have been identified by or that have been most frequently visited by the user. In instances in which the first device 310 will go offline without being able to download every file of interest, the download candidates may be initially prioritized for downloading purposes based upon a first rule, such as based upon the type of content. Then, for that content of the type that has the highest priority, the content may be further prioritized based upon a second rule, such as the source of the content.

In another exemplary embodiment, in response to an indication of an upcoming network disconnect, the processor 318 may be configured to automatically use the user interface 316 to ask the user to identify network content that the user wishes to download and store in the memory 314 prior to being disconnected from the network 305. The user may, for example, identify a website by typing in a URL/URI (Uniform Resource Locator/Identifier) or other web address for the website's homepage. The processor 318 may then download and store the homepage as well as the web pages (or other network content) accessible by following one or more links from the homepage or from other linked pages.

In one embodiment, the first device 310 is only configured to perform the above-described pre-caching operation in response to an indication that the first device 310 is to be disconnected from the network 305. This may be preferable for some mobile terminals where battery and/or processing power is in short supply. In other embodiments, pre-caching network content only in response to a received indication that the first device 310 is to be communicatively disconnected from the network 305 is an optional mode of the first device 310.

In some embodiments, the first device 310 may be configured to engage in general continuous pre-caching operations of the type configured to pre-cache a web page just before the user tries to access the web page when the user is browsing the network (e.g., pre-caching operations that are continuous and not in response to an indication that the first device 310 is to be disconnected from the network 305). This type of continuous pre-caching operation is used so that the web page can be presented to the user quicker than if the user had to wait for the page to be downloaded from the network. In such embodiments, the pre-caching operation described generally herein, which is performed in response to an indication of an upcoming network disconnect, may be more thorough or may be conducted in a different way than the continuous pre-caching operation used to provide faster browsing when a user is connected to the network. For example, the downloading rules of the two different pre-caching operations, which are used to determine the network content to be downloaded, may be different since the purposes of the two pre-caching operations are generally different.

Figure 5:
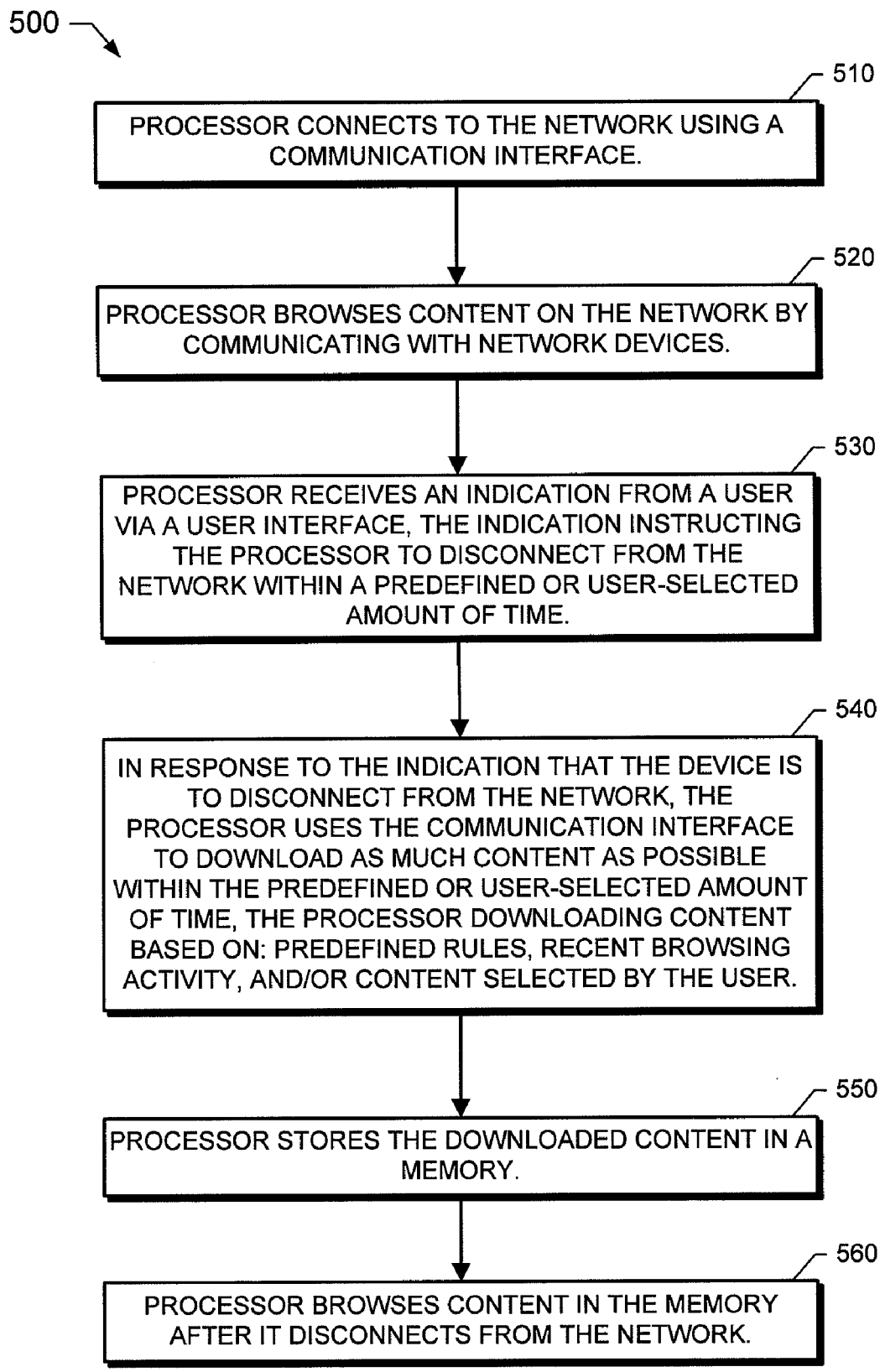
FIG. 5 is a flow diagram illustrating a process executed by the first device of FIG. 3, in accordance with an exemplary embodiment of the present invention.

Referring now to FIG. 5, a flow diagram is provided that illustrates a process 500 that may be executed by the first device 310, in accordance with an exemplary embodiment of the present invention. As illustrated by block 510, the processor 318 communicatively connects to the network 305 using a communication interface 312. As illustrated by block 520, the processor 318 may browse content on the network 305 by communicating with other devices, such as the second device 330, communicatively coupled to the network 305. For example, the processor may execute network browsing software stored in the memory 314. The processor 318 executing the network browsing software may permit a user of the first device 310 to use the user interface 316 to request content from other devices on the network 305 and to view this network content when it is provided to the first device 310.

As illustrated by block 530, at some point during the network browsing session, the processor 318 may receive user input from the user interface 316, the user input instructing the processor 318 to disconnect from the network 305. For example, the user may actuate a particular key that instructs the processor 318 to change from an online mode to an offline mode. In the exemplary embodiment illustrated by FIG. 5, the processor 318 is also instructed to disconnect from the network 305 within a specified amount of time. This amount of time may be a default amount of time or may be an amount of time specified by the user. Where the amount of time is user-specified, the amount of time may be specified when the user instructs the processor 318 to disconnect from the network 305 or at some earlier point in time.

As illustrated by block 540, in response to receiving user input instructing the processor 318 to disconnect from the network 305, the processor 318 may use the communication interface 312 to download as much content as the device 310 possibly can within the given amount of time, the downloading performed in accordance with predefined rules stored in the memory 314. As further illustrated by block 540 and as described above with respect to FIG. 4, the processor 318 may download network content based on predefined rules, recent browsing activity, and/or user-selections.

As illustrated by block 550, the processor 318 is further configured to store the downloaded content in a memory, such as the memory 314 of the first device 310. After the processor disconnects from the network 305, such as by changing from an online mode to an offline mode, the processor 318 may access the network content stored in the memory 314 by, for example, allowing a user of the first device 310 to browse the content offline using network browsing software, as illustrated by block 560. Additionally, the processor 318 can provide the user with a listing of the content that was downloaded, either in its entirety or at least partially. Additionally, the processor 318 can identify any content that had been selected for download that was unable to be downloaded prior to going offline.

For example, in an exemplary embodiment of the process illustrated by FIG. 5, the network 305 includes the Internet and the first device 310 is embodied as a mobile terminal. In such an embodiment, the user of the mobile terminal may, for example, be using the mobile terminal to view the headlines on the homepage of a news website. Several headlines on the homepage may interest the user, but the user may be about to board an airplane that restricts wireless network connectivity during the flight. As a result the user may actuate a user input device to instruct the mobile terminal to disconnect from the Internet in ten minutes. The ten minute time period may be specified by the user at the time that the user instructs the mobile terminal to disconnect from the Internet, the ten minute period may be specified by the user at some earlier time, or the ten minute time period may be a default time period. In response to the user's instructions to disconnect from the Internet, the mobile terminal may then begin downloading and storing network content from one or more devices on the network. In this regard, predefined downloading rules stored in the memory of the mobile terminal may instruct the mobile terminal to store the last page viewed by the user (e.g., the news website homepage) and to follow the links of that web page to other web pages. These other web pages may then be downloaded and stored and links identified on these web pages may be followed to still other web pages which may also be downloaded and stored, and so on. The mobile terminal may be configured to continuously download and store network content in this or a similar manner until the ten minutes expires, at which time the mobile terminal may disconnect from the network. In some embodiments, there may be a maximum amount of data that can be pre-cached in the mobile terminal, since memory in the mobile terminal may be limited. In one embodiment, the mobile terminal may be configured to provide the user with the ability to instruct the mobile terminal to disconnect before the ten minute time period expires, if the user desires to do so. After the mobile terminal disconnects from the network, the user may be able to continue using the mobile terminal's web browser to perform limited browsing of network content by browsing the network content stored in the mobile terminal's memory. For example, the user may be able to view the news websites homepage (now stored in the mobile terminal's memory) and to access news articles (now also stored in the mobile terminal's memory) by clicking on links in the homepage.

In another exemplary embodiment of the present invention, the user is viewing an RSS feed, such as a news feed, on the user's mobile terminal when the mobile terminal receives instructions from the user to disconnect from the network in one minute. In response to these instructions to disconnect, the mobile terminal may attempt to download as many news articles as possible from the web pages associated with the headlines identified in the RSS feed before the one minute expires and the mobile terminal is disconnected from the network. Since the time is limited, the downloading rules stored in the memory of the mobile terminal may also provide rules for prioritizing which network content gets downloaded before other network content. Thus, in this example, the downloading rules may instruct the processor of the mobile terminal to begin downloading and storing the most recent articles identified in the RSS feed before downloading and storing older articles identified in the RSS feed. In other examples, the downloading rules may instruct the processor to first download unread items prior to downloading items that have already been read.

Figure 6:
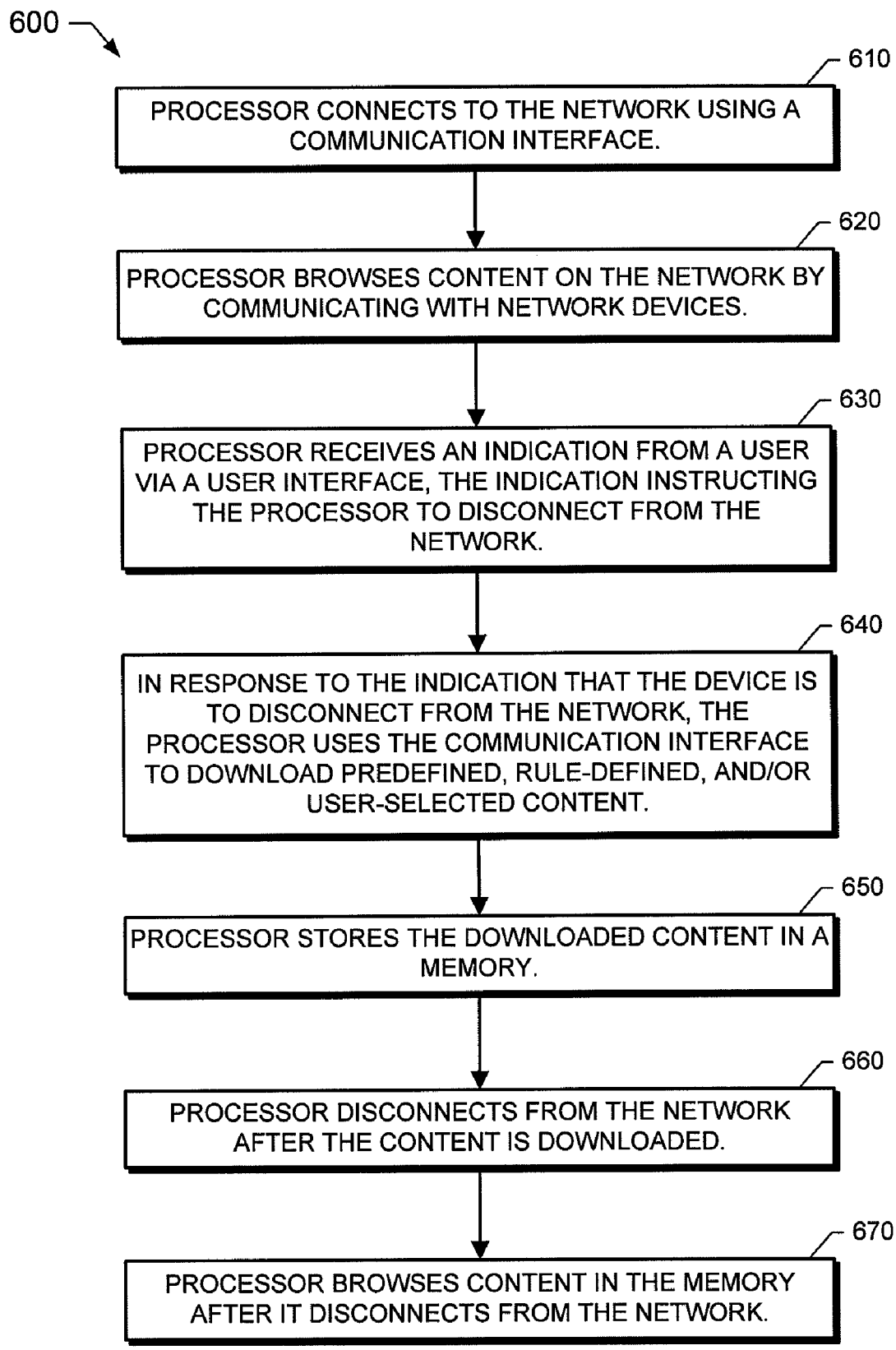
FIG. 6 is a flow diagram illustrating a process executed by the first device of FIG. 3, in accordance with another exemplary embodiment of the present invention.

FIG. 6 provides a flow diagram illustrating a process 600 that may be executed by the first device 310, in accordance with another exemplary embodiment of the present invention.

As illustrated by block 610, the processor 318 communicatively connects to the network 305 using a communication interface 312. As illustrated by block 620, the processor 318 may browse content on the network 305 by communicating with other devices, such as the second device 330, communicatively coupled to the network 305. For example, the processor 318 may execute network browsing software stored in the memory 314, thereby, permitting a user of the first device 310 to request content from other devices on the network 305 and to view this network content when it is provided to the first device 310.

As illustrated by block 630, at some point during the network browsing session, the processor 318 may receive user input from the user interface 316, the user input instructing the processor 318 to disconnect from the network 305. For example, the user may actuate a key or some other user input device of the first device 310 to instruct the first device 310 to go from an online mode of operation to an offline mode of operation.

As illustrated by block 640, in response to receiving the user input instructing the processor 318 to disconnect from the network 305, the processor 318 may use the communication interface 312 to download predetermined network content, such content selected by a user and/or content determined by predefined content selection rules stored in the memory 314. As illustrated by block 650, the processor 318 is further configured to store the downloaded content in a memory, such as the memory 314 of the first device 310. Once the processor 318 has downloaded the predetermined content, the processor 318 may then disconnect the first device 310 from the network 305, as illustrated by block 660. In one embodiment, the processor 318 disconnects from the network 305 after the processor 318 has downloaded all of the predetermined content or after the processor 318 has at least attempted to download all of the predetermined content. In other embodiments, the processor 318 is configured to disconnect from the network 305 after the earlier of the moment in time that all of the predetermined content has been downloaded or the moment in time that is a predefined maximum amount of time from the user's instruction to disconnect from the network 305. After the processor 318 disconnects from the network 305, the processor 318 may access the network content stored in the memory 314 by, for example, allowing a user of the first device 310 to browse the content offline using network browsing software, as illustrated by block 670.

For example, in an exemplary embodiment of the process illustrated in FIG. 6, in response to the user instructing the first device 310 to disconnect from the network, the first device 310 may automatically download and store web pages identified in a predefined list of the user's favorite web pages or a predetermined list of the user's most commonly viewed web pages. Such lists may be stored in the memory of the first device 310. The first device 310 may also be configured to download and store web pages associated with at least some of the links identified in the user's favorite or most commonly viewed web pages. Once the first device 310 downloads and stores all of the predefined web pages or other predetermined network content (or once the first device 310 at least makes an attempt to download and store all of the predefined content), then the first device 310 may automatically disconnect from the network 305. The user can then browse his or her favorite or most commonly viewed web pages offline, after the first device 310 disconnects from the network 305, since the first device 310 can access the web pages stored in its memory and present these to the user in a manner similar to presenting content to the user when the first device 310 is in an online mode.

In another exemplary embodiment of the process illustrated by FIG. 6, the first device 310 includes an email application configured to download email messages from a server on the network 305 and configured to present these emails to the user on a display of the first device 310. In such an embodiment, in response to the user of the first device 310 instructing the first device 310 to disconnect from the network 305, the email application may instruct the first device 310 to download any unread email messages and store these unread messages in the memory 314. After the unread messages are downloaded and stored locally, the application may instruct the first device 310 that it is now acceptable for the first device 310 to disconnect from the network 305. If the first device 310 has an opportunity to download addition content after the downloading of the unread messages and prior to its disconnection from the network 305, the first device 310 may also download some or all of the read messages. After the first device 310 disconnects from the network 305, the user can still use the email application in an offline mode to view unread messages stored in the local memory 314.

Figure 7:
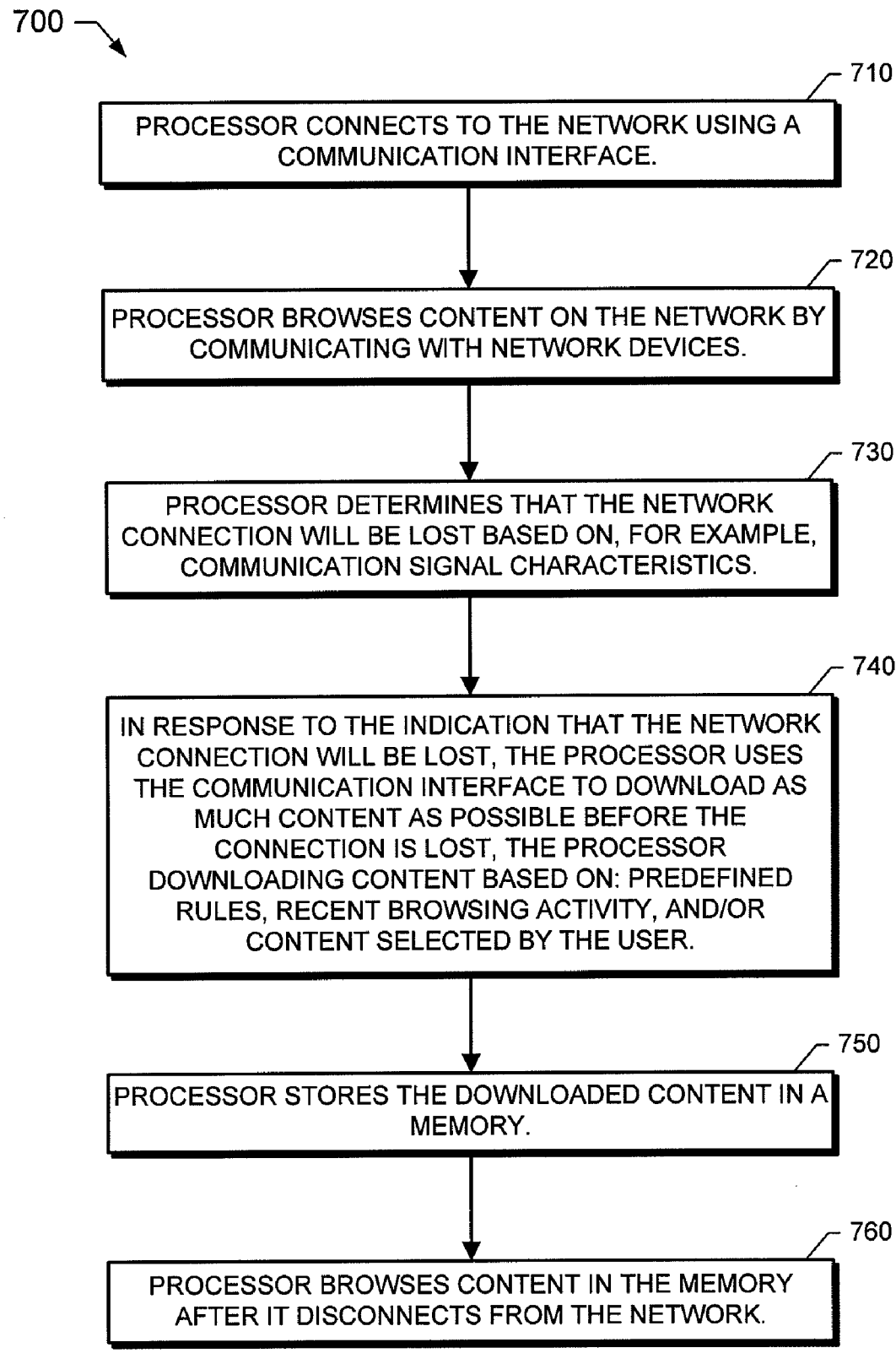
FIG. 7 is a flow diagram illustrating a process executed by the first device of FIG. 3, in accordance with yet another exemplary embodiment of the present invention.

FIG. 7 provides a flow diagram illustrating a process 700 that may be executed by the first device 310, in accordance with yet another exemplary embodiment of the present invention. As illustrated by block 710, the processor 318 communicatively connects to the network 305 using a communication interface 312. As illustrated by block 720, the processor 318 may browse content on the network 305 by communicating with other devices communicatively coupled to the network 305, such as the second device 330. For example, the processor 318 may execute network browsing software stored in the memory 314, thereby, permitting a user of the first device 310 to request content from other devices on the network 305 and to view this network content when it is provided to the first device 310.

As illustrated by block 730, at some point during the network browsing session, the processor 318 may determine that the communication signal used to communicatively couple the communication interface 312 with network 305 may soon be lost. The processor 318 may determine that the connection is to be lost based on characteristics of the network 305, the communication interface 312, and/or the communication signal. For example, where the communication interface 312 is wirelessly coupled to the network 305, the processor 318 may monitor the signal strength and, whenever the signal strength is very low and/or is steadily decreasing, the processor 318 may be configured to assume that network connection will likely be lost in the near future, at least temporarily. In some embodiments, the processor 318 may even determine an approximate amount of time before the processor 318 expects that the signal will be lost. For example, the processor 318 may extrapolate the point in time when a wireless signal is likely to be lost, based on the current strength of the wireless signal and the rate at which the wireless signal strength has recently decreased. Other examples of techniques by which an impending loss of network connectivity can be predicted are described herein, including reliance upon user input and predictions based on historical performance of a network or scheduled outages of a network.

In another exemplary embodiment, the first device 310 is able to receive or otherwise determine information about the position of the first device 310 relative to the network 305. With this information and with information about the capabilities of the first device's communication interface and about the signal characteristics of the network 305, the first device 310 may be able to anticipate when the first device 310 is moving into and out of range of a wireless network. For example, the first device 310 may be a mobile terminal that is being used to wirelessly access the network from a known hotspot. If the user is traveling with the mobile terminal through the hotspot, the mobile terminal may be configured to use the positional information to determine an approximate rate of motion and may then compare this to a known approximation of the hotspot boundaries (which may be a function of the capabilities of the mobile terminal's wireless transceiver and the hotspot's wireless transceiver) to determine when the mobile terminal is likely to leave the hotspot and lose the network connection. Similarly, the position information received by the first device 310 may be used by the first device 310 to determine that the mobile terminal is traveling into a "dead" area in the network where the communication interface cannot wirelessly connect to the network or that the mobile terminal is traveling into an area of known restricted network connectivity or mobile terminal usage, such as an airport or a hospital. Such position information may be obtained using a GPS device operatively coupled to the processor 318 of the first device 310. By tracking the movement of a mobile terminal over time, such as with a GPS device, predictions can be made as to the likely movement of the mobile terminal. If the mobile terminal is predicted to move along a path that encounters one or more "dead" areas, the mobile terminal may anticipate the impending outage in network coverage and download content in advance of entering the dead area. Similarly, the user of the mobile terminal may subscribe to a service, such as a social networking service or the like, that provides reports of "dead" areas or that predicts "dead" areas based on the past experience of the mobile terminal and its predicted path of movement (again based on GPS or other location information).

As illustrated by block 740, in response to the processor 318 receiving such indications that the communication interface 312 will likely become disconnected from the network 305 in the near future, the processor 318 may use the communication interface 312 to download as much content as possible or as much predefined content (e.g., user-defined content and/or rule-defined content) as possible before the connection with the network 305 is actually lost. As illustrated by block 750, the processor 318 is further configured to store the downloaded content in a memory, such as the memory 314 of the first device 310. If the communication interface 312 does become disconnected from the network 305, the processor 318 may access the network content stored in the memory 314 by, for example, allowing a user of the first device 310 to browse the content by using the network browsing software when the first device 310 is in an offline mode, as illustrated by block 760.

It should be noted that FIGS. 4-7 described above represent exemplary embodiments of the present invention. In other embodiments of the invention, one or more of the steps or processes associated with the blocks provided by FIGS. 4-7 may be considered optional or may be performed in an order other than that illustrated in FIGS. 4-7.

The functions described above with respect to the various embodiments of the present invention may be carried out in many ways. For example, any suitable means for carrying out each of the functions described above may be employed to carry out embodiments of the invention. According to one aspect of the present invention, all or a portion of the system generally operates under control of a computer program product. The computer program product for performing the various processes and operations of embodiments of the present invention includes a computer-readable storage medium, such as a non-volatile storage medium, and computer-readable program code portions, such as a series of computer instructions, embodied in the computer-readable storage medium. For example, in one embodiment, the processor of the first device generally operates under the control of a computer program product to download content from other network devices in response to an indication that the first device is to be disconnected from the network.

In this regard, FIGS. 3-7 are flowcharts or block diagrams of operations performed by methods, systems, devices, and computer program products according to embodiments of the present invention. It will be understood that each block of a flowchart or each step of a described method can be implemented by computer program instructions. These computer program instructions may be loaded onto a computer or other programmable apparatus to produce a machine, such that the instructions which execute on the computer or other programmable apparatus create means for implementing the functions specified in the described block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the described block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the described block(s) or step(s).

It will also be understood that each block or step of a described herein, and combinations of blocks or steps, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the at least one processor, cause the apparatus at least to:

direct a communication interface to communicate with at least one other device on a network in an instance in which the communication interface is communicatively connected to the network;

receive an indication that the communication interface will be communicatively disconnected from the network in the instance in which the communication interface is communicatively connected to the network;

in response to receiving the indication that the communication interface will be communicatively disconnected from the network, direct the communication interface to download information including a plurality of predefined web pages and respective levels of web pages accessible via links on the predefined web pages, wherein the apparatus is caused to direct the downloading based on predefined rules indicating at least a user-specified number of levels of web pages to be downloaded and a defined amount of time for each predefined web page for attempting to download each predefined web page before attempting to download a next predefined web page, and cause the downloaded information to be stored so that the apparatus may access the downloaded information in an instance in which the apparatus is communicatively disconnected from the network.

2. The apparatus of claim 1, further comprising:

a user interface operatively coupled to the apparatus and configured to permit communication between a user of the apparatus and the at least one processor, wherein, in response to receiving the indication that the communication interface will be communicatively disconnected from the network, the apparatus is caused to direct the user interface to ask the user whether the apparatus should download and store information from at least one device on the network to allow for offline browsing of the downloaded information.

3. The apparatus of claim 1, wherein the apparatus is further caused to direct automatic downloading and storing of information from the at least one other device on the network to begin in response to receiving the indication that the communication interface will be communicatively disconnected from the network.

4. The apparatus of claim 1, wherein, in response to receiving the indication that the communication interface will be communicatively disconnected from the network, the apparatus is caused to direct the communication interface to perform pre-caching of network content by downloading the information from the at least one other device and storing the downloaded information without displaying the downloaded information.

5. The apparatus of claim 4, wherein the apparatus is caused to direct performance of pre-caching of network content only after receiving the indication that the communication interface will be communicatively disconnected from the network.

6. The apparatus of claim 1, further comprising:

a user interface operatively coupled to the apparatus and configured to permit communication between a user of the apparatus and the at least one processor, wherein the indication that the communication interface will be communicatively disconnected from the network comprises user input received from the user interface, the user input instructing the apparatus to communicatively disconnect from the network.

7. The apparatus of claim 1, wherein the communication interface is configured to wirelessly connect to the network, and wherein the apparatus caused to receive the indication that the communication interface will be communicatively disconnected from the network comprises the apparatus being caused to determine that the communication interface will be communicatively disconnected from the network based on information about the position of the apparatus and/or wireless characteristics of the communication interface, the network, and/or a network communication signal received by the communication interface.

8. The apparatus of claim 1, wherein the indication that the communication interface will be communicatively disconnected from the network includes an indication of an amount of time before the communication interface will be communicatively disconnected from the network.

9. The apparatus of claim 8, wherein the apparatus is caused to direct downloading and storing of as much information from the network as the apparatus is capable of downloading and storing within the indicated amount of time, the apparatus directing the downloading and storing of the information in accordance with predetermined instructions.

10. The apparatus of claim 1, wherein, in response to receiving the indication that the communication interface will be communicatively disconnected from the network, the apparatus is caused to direct downloading and storing of user-selected information from the network.

11. The apparatus of claim 10, wherein the user-selected network information comprises network information associated with network destinations identified in a user's favorites list.

12. The apparatus of claim 1, wherein the predefined rules instruct the apparatus to cause network information associated with at least one link identified in at least one previously viewed network page to be downloaded and stored.

13. The apparatus of claim 1, further comprising:

a user interface operatively coupled to the apparatus and configured to permit communication between a user of the apparatus and the at least one processor, wherein the indication that the communication interface will be communicatively disconnected from the network comprises user input being received from the user interface, the user input instructing the apparatus to communicatively disconnect from the network at a particular point in time, wherein, in response to the received indication, the apparatus is caused to download and store network content before the particular point in time; and wherein the apparatus is caused to disconnect from the network at the particular point in time.

14. The apparatus of claim 1, wherein, in response to receiving the indication that the communication interface will be communicatively disconnected from the network, the apparatus is caused to direct downloading and storing of predefined information from the network, and wherein the apparatus is caused to automatically disconnect from the network after the apparatus downloads the predefined information from the network.

15. The apparatus of claim 1, wherein, in response to receiving the indication that the communication interface will be communicatively disconnected from the network, the apparatus is caused to direct downloading and storing of information from the network based on predefined rules, wherein the predefined rules specify an order in which content is to be downloaded.

16. The apparatus of claim 1, wherein the apparatus caused to receive the indication that the communication interface will be communicatively disconnected from the network includes being caused to receive the indication that the communication interface will be communicatively disconnected from the network, the indication that the communication interface will be communicatively disconnected from the network including an indication of an amount of time before the communication interface is to be communicatively disconnected from the network.

17. The apparatus of claim 1, wherein the apparatus caused to direct the communication interface to download information includes being caused to direct the communication interface to download information including the number of levels of web pages accessible via links to a number of identified web pages, the number of identified web pages being a user-specified number of web pages that have been most recently visited.

18. A method comprising:
in an instance in which a first device is communicatively connected to a network, receiving an indication that the first device is to be communicatively disconnected from the network;
in response to the received indication that the first device is to be communicatively disconnected from the network, directing downloading of information including a plurality of predefined web pages and respective levels of web pages accessible via links on the predefined web pages, wherein the downloading is based on predefined rules indicating at least a user-specified number of levels of web pages to be downloaded and a defined amount of time for each predefined web page for attempting to download each predefined web page before attempting to download a next predefined web page; and
directing storing of the downloaded information.

19. The method of claim 18, wherein receiving the indication that the first device is to be communicatively disconnected from the network comprises:
receiving user input instructing the first device to communicatively disconnect from the network.

20. The method of claim 18, wherein the method further comprises receiving an indication of an amount of time before the first device is to be communicatively disconnected from the network.

21. The method of claim 20, wherein directing downloading of information from at least one other device communicatively connected to the network in response to the received indication that the first device is to be communicatively disconnected from the network comprises:
directing downloading of as much information from the network as permitted within the indicated amount of time, in accordance with predetermined downloading instructions.

22. The method of claim 18, wherein, directing downloading of information from the at least one other device communicatively connected to the network in response to the received indication that the first device is to be communicatively disconnected from the network comprises:
directing downloading of user-selected information from the network.

23. The method of claim 22, wherein the user-selected network information comprises network information associated with network destinations identified in a user's favorites list.

24. The method of claim 18, wherein the predefined rules instruct the processor to direct downloading and storing of network information associated with at least one link identified in at least one previously viewed network page.

25. The method of claim 18, wherein directing downloading of information from at least one other device communicatively connected to the network in response to the received indication that the first device is to be communicatively disconnected from the network comprises directing downloading of predefined information from the network, the method further comprising:
directing the first device to disconnect from the network in response to an indication that the predefined information from the network has been downloaded and stored.

26. The method of claim 18, wherein directing downloading of information from at least one other device communicatively connected to the network in response to the received indication that the first device is to be communicatively disconnected from the network comprises:
directing downloading of information from the network based on predefined rules, wherein the predefined rules specify an order in which content is to be downloaded.

27. The method of claim 18, wherein receiving the indication that the communication interface will be communicatively disconnected from the network includes receiving the indication that the communication interface will be communicatively disconnected from the network, the indication that the communication interface will be communicatively disconnected from the network including an indication of an amount of time before the communication interface is to be communicatively disconnected from the network.

28. The method of claim 18, wherein directing downloading of information includes directing downloading of information including the number of levels of web pages accessible via links to a number of identified web pages, the number of identified web pages being a user-specified number of web pages that have been most recently visited.

29. A computer program product comprising at least one non-transitory computer-readable storage medium having computer-readable program code logic stored therein, the computer-readable program code logic comprising:
first code logic configured for receiving an indication that a first device is to be communicatively disconnected from a communication network; and
second code logic configured for directing downloading, in response to the received indication that the first device is to be communicatively disconnected from the network, of information including a plurality of predefined web pages and respective levels of web pages accessible via links on the predefined web pages, wherein the downloading is based on predefined rules indicating at least a user-specified number of levels of web pages to be downloaded and a defined amount of time for each predefined web page for attempting to download each predefined web page before attempting to download a next predefined web page.

30. The computer program product of claim 29, wherein the first code logic is further configured to receive an indication of an amount of time before the first device is to be communicatively disconnected from the network.

31. The computer program product of claim 30, wherein the second code logic comprises code logic configured for directing downloading of as much information from the network as permitted within the indicated amount of time, in accordance with predetermined downloading instructions.

32. The computer program product of claim 29, further comprising:
third code logic configured for receiving a user-specified indication of the network information to be downloaded by the second code logic in response to the received indication that the first device is to be communicatively disconnected from the network.

33. The computer program product of claim 29, further comprising:
third code logic configured for defining the network information to be downloaded by the second code logic in response to the received indication that the first device is to be communicatively disconnected from the network.

34. The computer program product of claim 33, wherein the third code logic is configured to define the network information to be downloaded based on network information recently accessed by the user and/or other network information not accessed by the user but identified in the network information recently accessed by the user.

35. The computer program product of claim 29, wherein the second code logic is configured to direct downloading of predefined information from the network, the computer-readable program code logic further comprising:

third code logic configured for directing the first device to disconnect from the network in response to an indication that the predefined information from the network has been downloaded and stored.

36. The computer program product of claim 29, wherein the second code logic further comprises being configured for directing downloading of information based on predefined rules, wherein the predefined rules specify an order in which content is to be downloaded.

37. An apparatus comprising:

means for receiving an indication, in an instance in which the apparatus is communicatively connected to the network, that the apparatus will be communicatively disconnected from the network;

means for directing downloading, in response to the received indication that the apparatus is to be communicatively disconnected from the network, of information including a plurality of predefined web pages and respective levels of web pages accessible via links on the predefined web pages, wherein the downloading is based on predefined rules indicating at least a user-specified number of levels of web pages to be downloaded and a defined amount of time for each predefined web page for attempting to download each predefined web page before attempting to download a next predefined web page; and means for directing storing of the downloaded information so that the apparatus may access the downloaded information when the apparatus is communicatively disconnected from the network.

* * * * *